(12) United States Patent
Ko et al.

(10) Patent No.: US 10,169,514 B2
(45) Date of Patent: Jan. 1, 2019

(54) APPROXIMATION OF RESISTOR-CAPACITOR CIRCUIT EXTRACTION FOR THREAD-SAFE DESIGN CHANGES

(71) Applicant: International Business Machines Corporation, Armonk, NY (US)

(72) Inventors: Tsz-mei Ko, Poughkeepsie, NY (US); Jason D. Morsey, Hopewell Junction, NY (US); Steven E. Washburn, Poughquag, NY (US); Patrick M. Williams, Salt Point, NY (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 15/408,856

(22) Filed: Jan. 18, 2017

(65) Prior Publication Data
US 2018/0203969 A1 Jul. 19, 2018

(51) Int. Cl.
*G06F 17/50* (2006.01)
(52) U.S. Cl.
CPC ...... *G06F 17/5054* (2013.01); *G06F 17/5031* (2013.01); *G06F 2217/84* (2013.01)
(58) Field of Classification Search
USPC ........................................... 716/102
See application file for complete search history.

(56) References Cited

U.S. PATENT DOCUMENTS

| 5,896,300 | A | * | 4/1999 | Raghavan ........... G06F 17/5022 |
| | | | | 703/15 |
| 6,029,117 | A | | 2/2000 | Devgan |
| 6,061,508 | A | | 5/2000 | Mehrotra et al. |
| 6,467,069 | B2 | | 10/2002 | Mehrotra et al. |
| 6,480,987 | B1 | | 11/2002 | McBride |
| 6,763,504 | B2 | | 7/2004 | Rao et al. |
| 7,853,910 | B1 | | 12/2010 | Zhu et al. |
| 7,865,851 | B2 | | 1/2011 | Gurney |

(Continued)

OTHER PUBLICATIONS

Lu et al., "Enablement of Variation-Aware Timing: Treatment of Parasitic Resistance and Capacitance", 8th International Symposium on Quality Electronic Design, ISQED'07, 2007, pp. 743-748.

*Primary Examiner* — Bryce M Aisaka
(74) *Attorney, Agent, or Firm* — Cantor Colburn LLP; Steven Meyers

(57) ABSTRACT

A system to design an integrated circuit and a method of fabricating an integrated circuit include performing a design change for a net among a plurality of nets of the integrated circuit. An extraction is performed for the net and includes re-computing values for a resistor-capacitor (RC) circuit representation of the net. Re-computed values resulting from the re-computing and a timestamp of the extraction are recorded. A capacitance value of a capacitor coupling the net with a neighboring net in the RC circuit representation of the neighboring net is changed to be the capacitance value of the capacitor coupling the net with the neighboring net that was re-computed for the RC circuit representation of the net. Timing and noise parameters are for the net and the neighboring net are updated to updated timing and noise parameters, and timing analysis is performed based on the updated timing and noise parameters.

20 Claims, 5 Drawing Sheets

(56) References Cited

U.S. PATENT DOCUMENTS

| | | |
|---|---|---|
| 7,913,216 B2 | 3/2011 | Chan et al. |
| 8,095,903 B2 | 1/2012 | Birch et al. |
| 2007/0204245 A1 | 8/2007 | Fotakis et al. |

\* cited by examiner

APPROXIMATION OF RESISTOR-CAPACITOR CIRCUIT EXTRACTION FOR THREAD-SAFE DESIGN CHANGES

BACKGROUND

The present invention relates to integrated circuit design, and more specifically, to the approximation of resistor-capacitor (RC) circuit extraction for thread-safe design changes.

The processes involved in designing and implementing an integrated circuit or chip include place and route. The place and route process refers to determining a location for each component (e.g., logic element) of the design and determining a path for the wiring that interconnects components of the design. The design and the physical arrangement of the design must comply with design criteria such as timing requirements. Thus, the place and route process is generally performed iteratively to ensure that the final design that is implemented in the physical chip complies with all design criteria.

SUMMARY

Embodiments include a method, system, and computer program product to design an integrated circuit for physical implementation. Aspects include performing a design change for a net among a plurality of nets of the integrated circuit and performing an extraction for the net. The extraction includes re-computing values for a resistor-capacitor (RC) circuit representation of the net. Re-computed values resulting from the re-computing and a timestamp of the extraction are recorded. Aspects also include changing a capacitance value of a capacitor coupling the net with a neighboring net in the RC circuit representation of the neighboring net to be the capacitance value of the capacitor coupling the net with the neighboring net that was re-computed for the RC circuit representation of the net. Timing and noise parameters for the net and the neighboring net are updated to updated timing and noise parameters, and timing analysis is performed based on the updated timing and noise parameters.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As previously noted, place and route is one of the processes involved in chip design. As also noted, the process is performed iteratively to ensure that timing, power, and other constraints of the design are met. Thus, each place and route iteration involves timing analysis, for example. For the purposes of analysis, the wires are represented as an RC circuit. Each wire that connects the output of one component to the input of another can be referred to as a net. A netlist is maintained to track each net in the design. Thus, when a design change involves the addition of a component, the removal of a component, or the movement of a component, a net can be added, deleted, or moved, and the netlist is updated accordingly. A design change involving one net can affect a neighboring net.

A prior approach to dealing with design changes has involved computing new RC circuit values, in a process referred to as extraction, for not only a net that has undergone a design change but also for every neighboring net affected by the design change. However, this approach is not conducive to multi-threaded design changes. That is, when multiple design changes are performed by multiple processors operating in parallel, two or more of the design changes can affect the same net. Thus, accurate extraction of the net in consideration of all the changes is a challenge. Additionally, re-computing the RC circuit values for neighboring nets when most of the values may not have significantly changed is inefficient.

Turning now to an overview of aspects of the present invention, one or more embodiments relate to performing extraction only for a net that has undergone a design change. In the RC circuit representation, neighboring nets are coupled by a capacitor. Thus, when a design change is made in a neighboring net, an extraction is avoided by considering only the updated capacitance value of the coupling capacitor. The netlist is used to identify nets that have undergone a design change and those that neighbor a net that has undergone a design change. An extraction is performed for the nets that have undergone a design change and the updated capacitance, based on the extraction, is used by neighboring nets.

Figure 1:
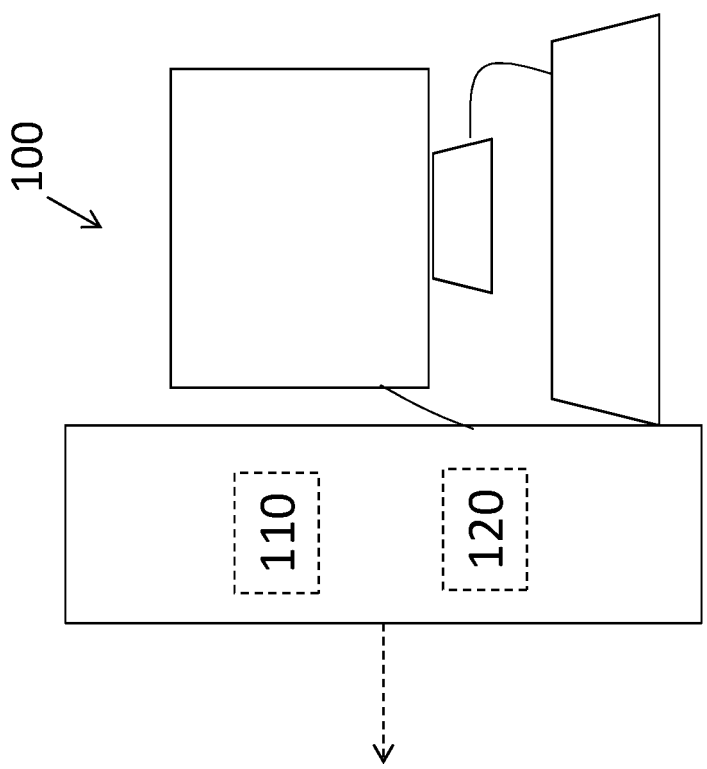
FIG. 1 is a block diagram of an exemplary processing system used to process one or more threads associated with a chip design and the resulting physical implementation of the integrated circuit.
Figure 1:
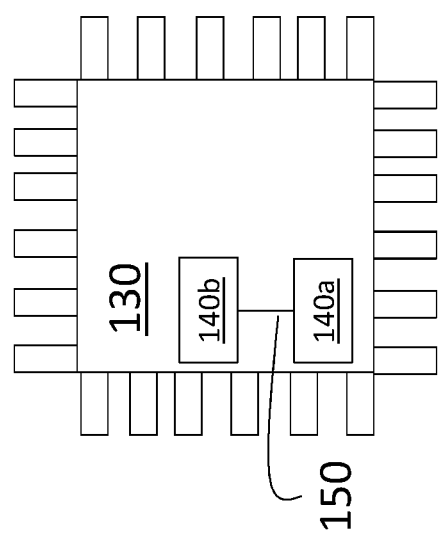

Turning now to a more detailed description of one or more embodiments, FIG. 1 is a block diagram of an exemplary processing system 100 used to process one or more threads associated with a chip design and the resulting physical implementation of the integrated circuit 130. Two exemplary components 140a, 140b (referred to generally as 140) and a net 150 connecting the two are shown. The exemplary components 140 can be logic gates, buffers, and latches. The processing system 100 includes one or more memory devices 110 and one or more processors 120. Multiple of the processors 120 can be used to process multiple threads. In alternate embodiments, multiple processing systems 100 can be used to process the multiple threads. The memory device 110 stores instructions implemented by the processor 120. As further discussed below, these instructions include processes used to perform the design changes and timing updates. The memory device 110 also stores values of an RC circuit representation of each net 150 in the integrated circuit design.

Figure 2:
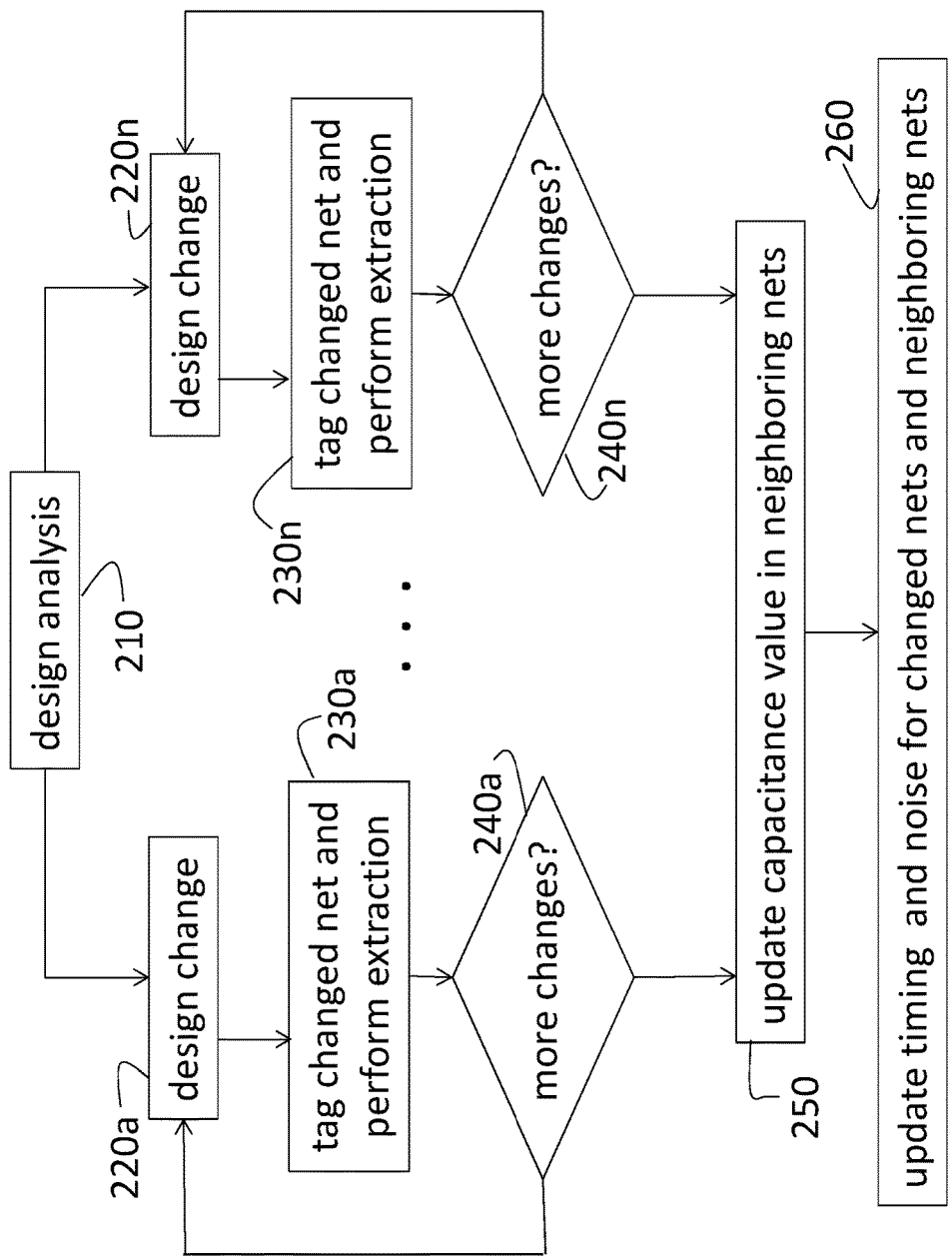
FIG. 2 is a process flow of a method of performing approximation of RC circuit extraction for thread-safe design changes according to one or more embodiments.

FIG. 2 is a process flow of a method of performing an approximation of RC circuit extraction for thread-safe design changes according to one or more embodiments. Specifically, for nets 150 neighboring those that undergo design changes, the most recent capacitance value for the capacitor coupling the two nets 150 is used to approximate RC circuit extraction. As a result, a complete extraction process is avoided. Additionally, by updating all capacitance values for all neighboring nets 150 following completion of extraction for nets 150 that have undergone a design change, the issues associated with capturing the latest net changes in a multi-threaded environment are addressed.

At block 210, performing design analysis refers to performing timing, power, and other performance analysis of the design following a place and route process. This analysis can indicate that design criteria (e.g., timing) are not being met in one or more portions of the chip. The chip design can be organized into subdivisions (e.g., macros, units), and one or more subdivisions can be processed in parallel in a multi-threaded arrangement. Thus, the design analysis, at block 210, can lead to design changes in more than one thread.

At blocks 220a through 220n (referred to generally 220), a design change is made to a net 150 in an associated thread. Exemplary design changes that directly affect a net 150 include the addition or removal of a component, a replacement of a component, and movement of the net 150. Each design change, at block 220, is followed by tagging the changed net 150 and performing extraction at blocks 230a through 230n (referred to generally as 230) for each thread. Specifically, the netlist that maintains the information about all the nets 150 in the design is updated to reflect the changed values associated with the net 150 that underwent the design change (at block 220) and to indicate a time stamp of when the values were updated. The netlist can be stored by one or more memory devices 110 of one or more processing systems 100 used in the design of the integrated circuit 130. The capacitor 310 (FIG. 3) that couples the changed net 150 with a neighboring net is tagged as invalid in the RC circuit representation for the neighboring net. At blocks 240a through 240n (referred to generally as 240), a check is made as to whether another design change is pending for each thread. Processes at blocks 220 and 230 are performed for each design change for each thread.

Once all the design changes are completed, the netlist includes extracted RC circuit values for all changed nets 150 in all the threads and a timestamp of when the values were added to the netlist. In addition, all the changed nets 150 and, specifically, all the capacitors 310 that couple the changed nets 150 with neighboring nets 150 are tagged (at block 230). This information is used at block 250. At block 250, updating capacitance values in neighboring nets includes identifying all the tagged capacitors 310 that couple nets 150 that neighbor all nets 150 that are changed. The timestamp on the netlist is then used to determine the most recent change that affects a neighboring net 150.

The timestamp is most significant when multiple changes have been made that affect the same net 150 and, specifically, the same capacitor 310. This is further discussed for exemplary design changes detailed with reference FIG. 3. When the most recent change affecting a capacitor 310 coupling a changed net 150 to a given neighboring net 150 is identified, the capacitance value of the coupling capacitor 310 included in the RC circuit representation of that given neighboring net 150 is updated. Specifically, the capacitance value is changed to the capacitance value of the same capacitor 310 that is stored among extracted values in the RC representation of the changed net 150 in association with the timestamp. Once all neighboring net capacitance values have been updated at block 250, updating timing and noise for changed nets 150 and neighboring nets 150, at block 260, facilitates another iteration of performing analysis and repeating the processes shown in FIG. 2, as needed. The processes shown in FIG. 2 can be repeated as many times as necessary to ensure that all design criteria are met. When all design criteria are met according to the analysis, the processes can proceed to physical implementation of the integrated circuit 130.

Figure 3:
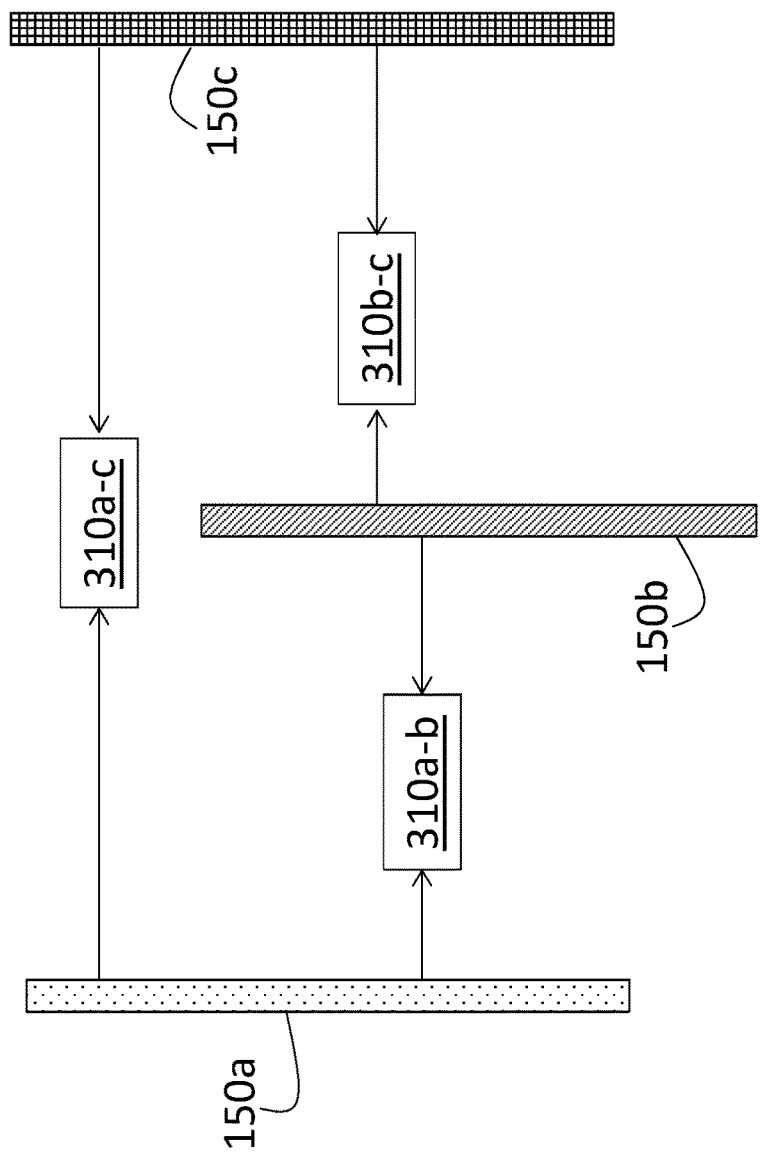
FIG. 3 shows an exemplary set of nets that are processed according to one or more embodiments.

FIG. 3 shows an exemplary set of nets 150a, 150b, 150c that are processed according to one or more embodiments. Each net 150a, 150b, 150c is connected to the others. Thus, there is a capacitor 310a-b, 310a-c, 310b-c (referred to generally as 310) that couples each pair of nets 150. That is, the capacitor 310a-b couples net 150a to net 150b, capacitor 310a-c couples net 150a to net 150c, and capacitor 310b-c couples net 150b to net 150c. Table 1 indicates extractions that are performed (at block 230) to the set of nets 150 shown in FIG. 3 based on design changes (at block 220) and the time at which the extractions are done. The information shown in Table 1 represents some of the information stored in the netlist.

TABLE 1

Exemplary timestamp and extraction information.

| timestamp | extraction |
|---|---|
| t0 | net 150a extraction (capacitor 310a-b and capacitor 310a-c values updated in net 150a RC representation) |
| t1 | net 150b extraction (capacitor 310a-b and capacitor 310b-c values updated in net 150b RC representation) |

As Table 1 indicates, a design change is implemented (at block 220) to net 150a and, accordingly, an extraction is performed (at block 230) to compute new values for the RC circuit representation of net 150a at time t0. The capacitance values of capacitors 310a-b and 310a-c are re-computed in the RC circuit representation of net 150a and these capacitors 310a-b and 310a-c are tagged. However, the capacitance value of capacitor 310a-b is not re-computed in the RC circuit representation of net 150b, because no extraction is performed for this neighboring net 150 of changed net 150a. Similarly, the capacitance value of capacitor 310a-c is not re-computed in the RC circuit representation of net 150c, because no extraction is performed for this neighboring net of net 150a either.

As Table 1 also indicates, a design change is implemented (at block 220) to net 150b and an associated extraction is performed (at block 230) to compute new values for the RC circuit representation of net 150b at time t1, which is after time t0. The design change to net 150a and net 150b may have been processed within the same thread in two different iterations or can be associated with two different threads. The capacitance values of capacitors 310a-b and 310b-c are updated in the RC circuit representation of net 150b, and capacitors 310a-b and 310b-c are tagged.

It bears noting that the tagging of capacitor 310a-b based on the extraction at timestamp t1 supersedes the tagging of the same capacitor 310a-b that was done when the net 150a was changed and an extraction for net 150a was performed at timestamp t0. That is, the RC representation of net 150b now has the more up-to-date capacitance value for capacitor 310a-b. Previously, at timestamp t0, the RC representation of net 150a had the most up-to-date capacitance value for capacitor 310a-b. This example illustrates the importance of the timestamp in identifying the latest update to a given capacitance value. The capacitance value of capacitor 310b-c is not re-computed in the RC circuit representation of net 150c, because no extraction is performed for this neighboring net 150 of net 150b.

According to the processing discussed with reference to FIG. 2, once the design changes are completed, capacitance values of coupling capacitors 310 to neighboring nets are updated (at block 250). The neighboring net 150 of each changed (extracted) net 150 is considered based on the tagging of capacitors 310 that couple a changed net 150 to a neighboring net 150. The timestamp of extraction is also considered. That is, net 150b is a neighboring net 150 of changed net 150a (along with net 150c) as of timestamp t0, but net 150a is a neighboring net 150 of changed net 150b (along with net 150c) as of later timestamp t1. Thus, with respect to capacitor 310a-b, the extraction of net 150b at time t1 is the latest change. Again, even though an extraction was performed for net 150a at time t0, this net 150a is the neighboring net 150 to net 150b, which underwent extraction at a later time t1. Thus, the capacitance value of capacitor 310a-b in the RC circuit representation of net 150a is updated to be the same capacitance value as capacitor 310a-b in the RC circuit representation of net 150b.

With respect to another tagged capacitor 310, capacitor 310a-c, the extraction of net 150a at time t0 is the latest change affecting the capacitor 310a-c according to the tag and associated timestamp. Thus, the capacitance value of capacitor 310a-c in the RC circuit representation of neighboring net 150c is updated to be the same capacitance value as capacitor 310a-c in the RC circuit representation of net 150a. With respect to capacitor 310b-c, which couples changed net 150b to neighboring net 150c, the extracted capacitance value at time t1 associated with the RC circuit representation of net 150b is used as the capacitance value of capacitor 310b-c in the RC circuit representation of net 150c. With the extracted or updated values in place, updated timing and noise can be determined (at block 260) for the present iteration of the place and route process.

Figure 4:
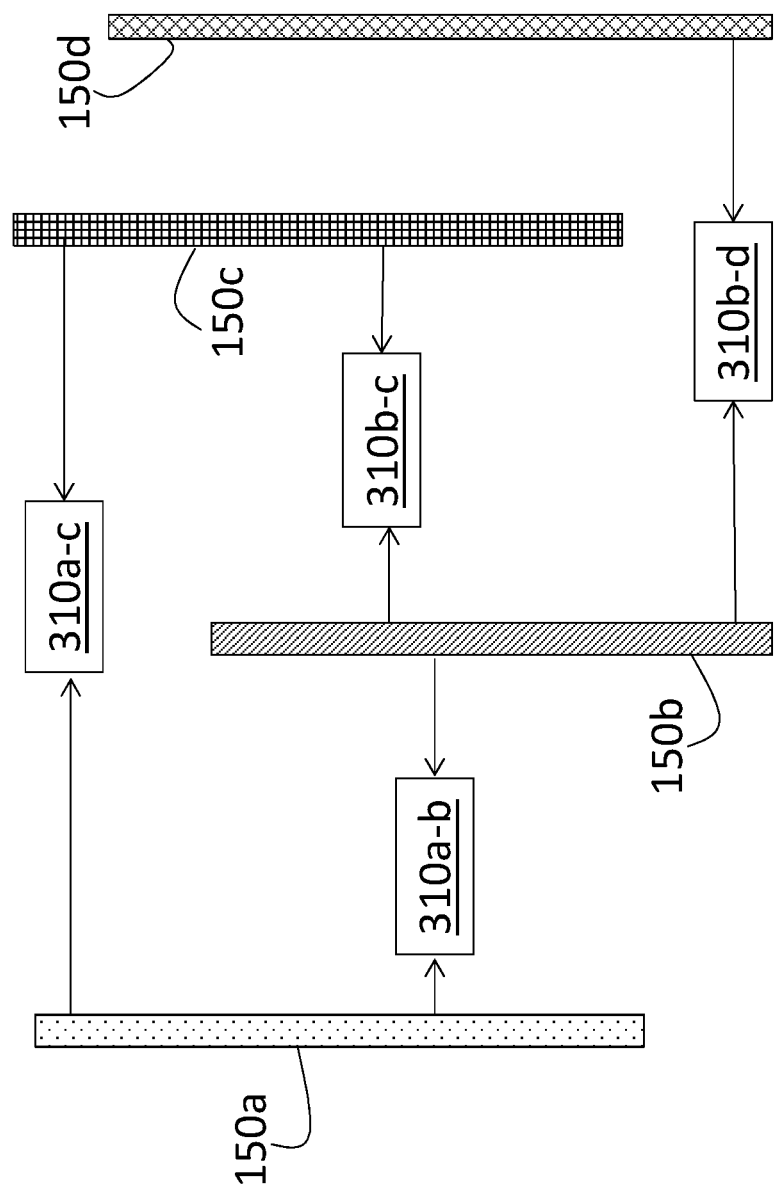
FIG. 4 shows an exemplary set of nets that are processed according to one or more embodiments.

FIG. 4 shows an exemplary set of nets 150a, 150b, 150c, 150d that are processed according to one or more embodiments. The example discussed with reference to FIG. 4 differs from the one discussed with reference to FIG. 3 because net 150c is removed and net 150d is added according to design changes. Table 2 indicates the changes and associated timestamps.

TABLE 2

Exemplary timestamp and extraction information.

| timestamp | extraction |
|---|---|
| t0 | net 150b extraction (capacitor 310a-b and capacitor 310b-c values updated in net 150b RC representation) |
| t1 | net 150c deleted |
| t2 | net 150d extraction based on addition of net 150d (capacitor 310b-d value calculated as part of net 150d RC representation) |

Based on the design changes, tags, and associated timestamps, the processing at block 250 includes updating the capacitance value of capacitor 310a-b in the RC representation of net 150a with the capacitance value computed during the extraction of net 150b at timestamp t0. The capacitance values of capacitors 310a-c and 310b-c are set to 0 based on the deletion of net 150c at timestamp t1. The capacitance value of capacitor 310b-d is added to the RC representation of net 150b based on the addition of net 150d at timestamp t2. Net 150a is unaffected by the addition of net 150d, because net 150a is not a neighboring net 150 of net 150d.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment of the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or memory) (110) having computer readable program instructions thereon for causing a processor to carry out aspects of the present invention. An exemplary computer program product is discussed with reference to FIG. 5.

Figure 5:
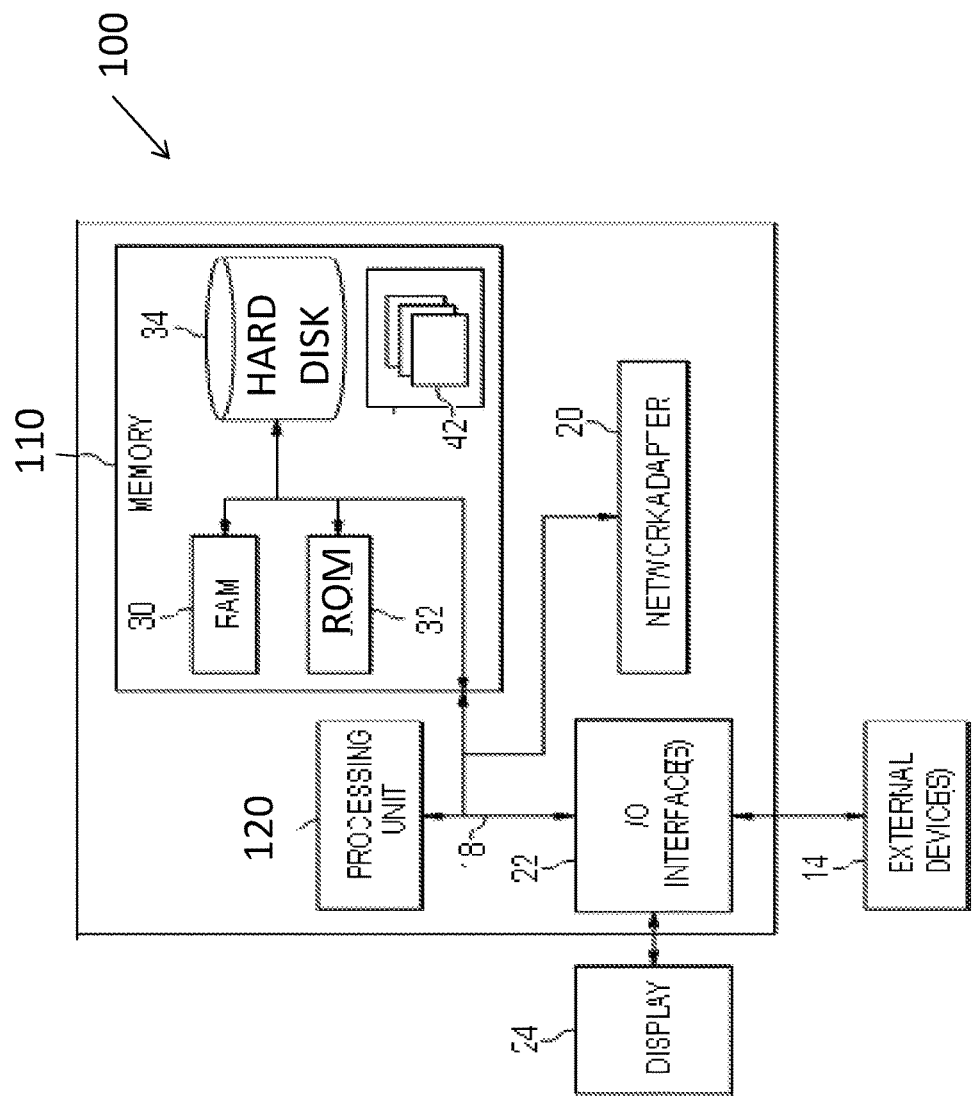
FIG. 5 is a detailed block diagram of an exemplary processing system according to one or more embodiments.

FIG. 5 is a detailed block diagram of an exemplary processing system 100 according to one or more embodiments. The computer readable storage medium (memory devices 110) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette 42, a hard disk 34, a random access memory (RAM) 30, a read-only memory (ROM) 32, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire 18.

Computer readable program instructions described herein can be downloaded to respective computing/processing devices (120) from a memory 110 or to an external computer or external storage device (e.g., 14) via an input/output interface 22. The download to an external device 14 can be, for example, via the Internet, a local area network, a wide area network and/or a wireless network. The network may comprise copper transmission cables, optical transmission fibers, wireless transmission, routers, firewalls, switches, gateway computers and/or edge servers. A network adapter card 20 in each computing/processing device can receive computer readable program instructions from the network and forward the computer readable program instructions for storage in a computer readable storage medium, or memory 110, within the respective computing/processing device 100.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of fabricating an integrated circuit, the method comprising:
 performing, using a processor, a design change for a net among a plurality of nets of the integrated circuit;
 performing, using the processor, an extraction for the net, the performing the extraction including re-computing values for a resistor-capacitor (RC) circuit representation of the net;
 recording re-computed values resulting from the re-computing and a timestamp of the extraction;
 changing a capacitance value of a capacitor coupling the net with a neighboring net in the RC circuit representation of the neighboring net to be the capacitance value of the capacitor coupling the net with the neighboring net that was re-computed for the RC circuit representation of the net;

updating timing and noise parameters for the net and the neighboring net to updated timing and noise parameters;

performing timing analysis based on the updated timing and noise parameters; and implementing a physical implementation of the integrated circuit based on a result of the timing analysis meeting design criteria.

2. The method according to claim 1, further comprising determining the design change based on a previous iteration of the timing analysis.

3. The method according to claim 1, wherein the performing the design change and performing the extraction is for two or more nets using two or more of the processors in a multi-threaded arrangement.

4. The method according to claim 3, wherein the changing the capacitance value is performed for all the neighboring nets of all the two or more nets that undergo the design change after the performing the extraction is completed for all the two or more nets.

5. The method according to claim 4, wherein the changing the capacitance value of the capacitor coupling one of the two or more nets with a corresponding neighboring net is based on a most recent change to the capacitance value based on more than one of the extractions affecting the capacitance value.

6. The method according to claim 5, wherein the changing the capacitance value based on the most recent change is based on the timestamp associated with the most recent extraction that re-computed the capacitance value.

7. The method according to claim 3, wherein the performing the design change and the extraction is done iteratively for each thread in the multi-threaded arrangement.

8. A system to design an integrated circuit, the system comprising:

a memory device configured to store a resistor-capacitor (RC) circuit representation of a plurality of nets associated with the integrated circuit;

a processor associated with one net among the plurality of nets, the processor configured to perform a design change for the one net among the plurality of nets, perform an extraction for the one net, the extraction including re-computation of values for the RC circuit representation of the one net, and record re-computed values resulting from the re-computation with a timestamp for the extraction; and a second processor associated with a neighboring net of the one net, the second processor configured to change a capacitance value of a capacitor coupling the one net with the neighboring net in the RC circuit representation of the neighboring net to be the capacitance value of the capacitor coupling the one net with the neighboring net that was re-computed for the RC circuit representation of the one net, wherein a physical implementation of the integrated circuit is obtained based on the design change and the capacitance value change.

9. The system according to claim 8, wherein the processor and the second processor are a same processor.

10. The system according to claim 8, wherein the processor and the second processor operate in a multi-threaded arrangement.

11. The system according to claim 10, wherein the processor and the second processor perform the design change and the extraction for two or more nets in parallel.

12. The system according to claim 11, wherein the processor and the second processor change the capacitance value for all the neighboring nets of the two or more nets after performing the extraction for the two or more nets.

13. The system according to claim 12, wherein the processor and the second processor change the capacitance value based on the most recent extraction that affects the capacitance value according to the timestamp associated with each extraction.

14. The system according to claim 10, wherein the processor and the second processor perform the design change and the extraction iteratively.

15. A computer program product for performing design of an integrated circuit, the computer program product comprising a computer readable storage medium having program instructions embodied therewith, the program instructions executable by one or more processors to perform a method comprising:

performing a design change for a net among a plurality of nets of the integrated circuit;

performing an extraction for the net, the performing the extraction including re-computing values for a resistor-capacitor (RC) circuit representation of the net;

recording re-computed values resulting from the re-computing and a timestamp of the extraction;

changing a capacitance value of a capacitor coupling the net with a neighboring net in the RC circuit representation of the neighboring net to be the capacitance value of the capacitor coupling the net with the neighboring net that was re-computed for the RC circuit representation of the net;

updating timing and noise parameters for the net and the neighboring net to updated timing and noise parameters; and performing timing analysis based on the updated timing and noise parameters, wherein a physical implementation of the integrated circuit is obtained based on a result of the timing analysis meeting design criteria.

16. The computer program product according to claim 15, wherein the determining the design change is based on a previous iteration of the timing analysis.

17. The computer program product according to claim 15, wherein the performing the design change and performing the extraction is for two or more nets using two or more of the processors in a multi-threaded arrangement.

18. The computer program product according to claim 17, wherein the changing the capacitance value is performed for all the neighboring nets of all the two or more nets that undergo the design change after the performing the extraction is completed for all the two or more nets.

19. The computer program product according to claim 18, wherein the changing the capacitance value of the capacitor coupling one of the two or more nets with a corresponding neighboring net is based on a most recent change to the capacitance value based on more than one of the extractions affecting the capacitance value.

20. The computer program product according to claim 19, wherein the changing the capacitance value based on the most recent change is based on the timestamp associated with the most recent extraction that re-computed the capacitance value.

* * * * *